Feb. 3, 1931. E. G. BULLIS 1,791,075
AUTOMOBILE DOOR
Filed July 23, 1928
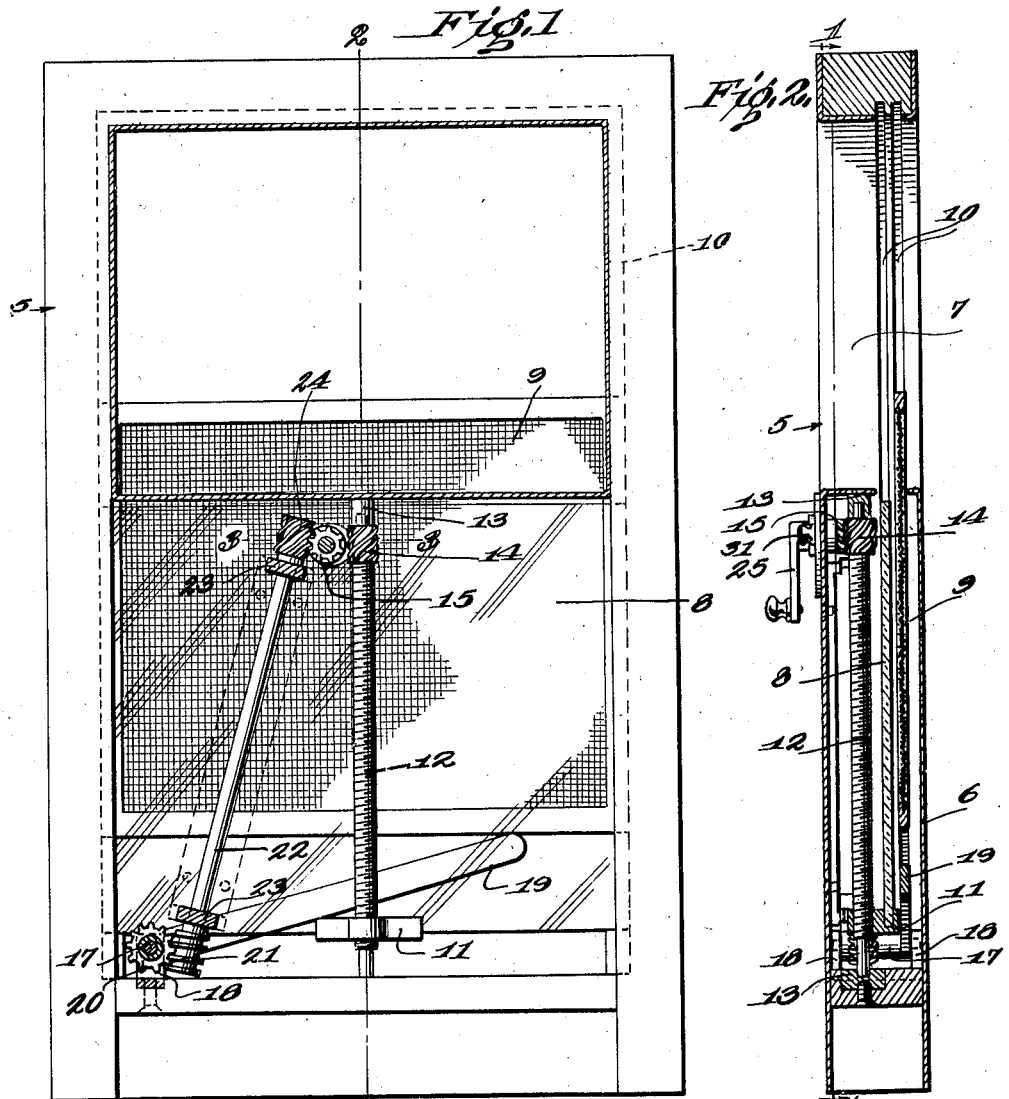
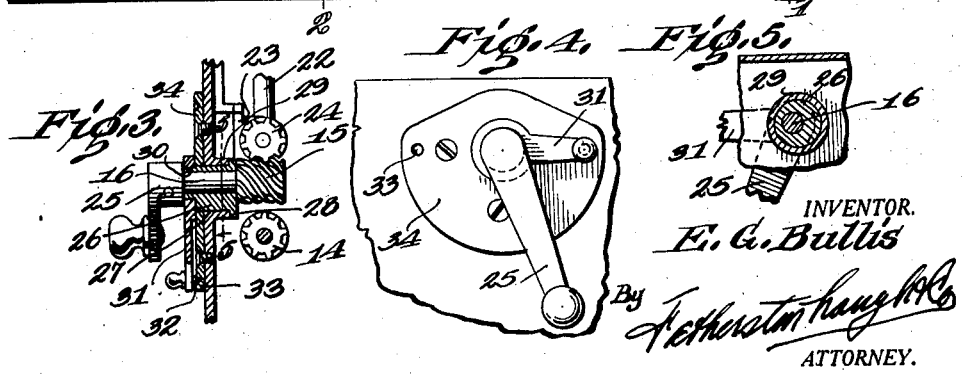
INVENTOR.
E. G. Bullis
By Featherstonhaugh & Co.
ATTORNEY.

Patented Feb. 3, 1931

1,791,075

UNITED STATES PATENT OFFICE

EMORY G. BULLIS, OF FULTON, NEW YORK

AUTOMOBILE DOOR

Application filed July 23, 1928. Serial No. 294,771.

This invention relates to automobile doors and is an improvement of the subject matter covered in my prior application Serial Number 241,996, filed April 10, 1928.

In the prior application referred to I have disclosed an automobile door equipped with a window glass panel and a screen panel arranged to be selectively and independently actuated through the instrumentality of a single operating handle.

The object of the present invention is to provide improved and more reliable means for selectively establishing a drive connection between the operating handle and either of said panels and to this end the invention consists in certain novel details of construction, combination and arrangement of parts as will be more particularly pointed out in the following detailed description taken in connection with the accompanying drawings, in which, Figure 1 is a view partly in elevation and partly in vertical section of an automobile door constructed in accordance with the present invention, the plane of the section being substantially along the line 1—1, Figure 2;

Figure 2 is a transverse vertical sectional view taken substantially along the line 2—2, Figure 1;

Figure 3 is a horizontal sectional view taken along the line 3—3, Figure 1;

Figure 4 is a fragmentary elevation showing the mounting of the operating handle, and, Figure 5 is a detail sectional view taken along the line 5—5, Figure 3.

Proceeding now to a more detailed discussion of the drawings 5 designates an automobile door having its lower portion in the form of a casing 6 and its upper portion provided with a window opening 7. The glass panel 8 and the screen panel 9 are mounted in suitable guideways 10 so as to travel from a lowered position within the casing 6 to an elevated position obstructing the window opening 7.

At its lower edge the glass panel 8 is secured to a block 11 through which is threaded a vertically disposed screw 12 having its terminals mounted in suitable bearings 13. Adjacent the upper bearing 13 the screw 12 is provided with a worm gear 14 adapted at times to be engaged and driven by a worm wheel 15 fixed to the inner end of an operating or handle shaft 16. A transversely extending shaft 17 is journalled in suitable bearings 18 positioned in one of the lower corner portions of the casing 16. Fixed to the shaft 17 is a relatively long crank arm 19 having its free end engaging the lower edge of the screen panel 8. Also fixed to the shaft 17 is a gear 20 meshing with a worm 21 fixed to the lower end of a vertically extending inclined shaft 22. Shaft 22 is mounted in suitable bearings 23 and is equipped at its upper end with a worm 24 adapted at times to be engaged and driven by the worm 15 of the handle shaft 16. As shown to advantage in Figures 1 and 3 the relative arrangement of the screw 12 and shafts 22 and 16 is such that the worm 15 of the handle shaft 16 may be selectively engaged with either of the worms 14 and 24 by lateral shifting of the handle shaft 16.

In accordance with the present invention, the handle shaft 16 is fitted at its outer extremity with a handle or crank 25 and is eccentrically mounted in a rotatable bearing sleeve 26. The sleeve 26 is turnably mounted in a suitable opening 27 formed in the inner side wall of the casing 6 and is provided at its inner end with a flange 28 which fits between the worm 15 and the inner edge of an inwardly projecting collar 29 surrounding the aforesaid opening 27. Due to its interposition between the worm 15 and the collar 29 the flange 28 serves as a stop preventing longitudinal shifting of the shaft 16 and sleeve 26 in the direction of the collar 29. At its outer end sleeve 26 is provided with a reduced portion 30 to which is fixed an operating lever 31 provided at its free end with a detent 32 adapted to be selectively engaged in either of a pair of sockets 33 provided in a face plate 34 which is secured to the inner wall of the casing 6 between the operating lever 31 and the opposing surface of said wall. The end of the lever 31 interposed between the face plate 34 and the handle or crank 25 serves to prevent longitudinal shifting of shaft 16 and sleeve 26 in the direction of the casing 6.

By swinging the lever 31 to engage the detent 32 in a selected one of the sockets 33 the sleeve 26 may be revolved to shift the shaft 16 laterally and thereby cause the worm 15 to mesh either with the worm 14 or the worm 24.

Having thus fully described what I now conceive to be the preferred embodiment of the invention it will be understood that various changes in the construction and arrangement of parts may be resorted to within the scope and spirit of the appended claims.

What I claim is:

1. The combination of an element having a window opening formed therein, a plurality of panels movable to and from a position obstructing said opening, a plurality of rotatably mounted gear elements, means connecting each gear element to one of said panels, and functioning to move the panel to and from the window opening dependent on the direction in which the gear element is rotated, a handle shaft having a drive gear thereon, a rotatable bearing in which the handle shaft is rotatably and eccentrically mounted and means for rotating said bearing to engage the drive gear with a selected one of said gear elements.

2. The combination of an element having a window opening formed therein, a plurality of panels movable to and from a position obstructing said opening, a plurality of rotary shafts, each shaft being operatively connected to one of said panels to move the panel to or from the window opening dependent upon the direction in which the shaft is rotated, a rotary handle shaft, a gear element on said handle shaft, a rotary sleeve in which the handle shaft is eccentrically mounted and means for turning said sleeve to selectively engage said gear element with coacting gear elements carried by the first mentioned shafts.

In testimony whereof I hereunto affix my signature.

EMORY G. BULLIS.